United States Patent
Matula et al.

(10) Patent No.: US 10,694,041 B2
(45) Date of Patent: Jun. 23, 2020

(54) ANALYTICS-GUIDED CALL ROUTING WITH THIRD PARTY

(71) Applicant: Avaya Inc., Santa Clara, CA (US)

(72) Inventors: Valentine C. Matula, Granville, OH (US); Joseph Andreas, Annandale, NJ (US); Stephen Japuntich, Chaska, MN (US); Diego Klajner, Parkland, FL (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/046,227

(22) Filed: Jul. 26, 2018

(65) Prior Publication Data
US 2019/0045059 A1 Feb. 7, 2019

Related U.S. Application Data

(60) Provisional application No. 62/540,708, filed on Aug. 3, 2017.

(51) Int. Cl.
*H04M 3/00* (2006.01)
*H04M 3/523* (2006.01)

(52) U.S. Cl.
CPC ....... *H04M 3/5235* (2013.01); *H04M 3/5232* (2013.01)

(58) Field of Classification Search
CPC .. H04M 3/5175; H04M 3/523; H04M 3/5232; H04M 3/5233
USPC ............ 379/265.01–265.02, 265.11
See application file for complete search history.

(56) References Cited

U.S. PATENT DOCUMENTS

7,657,021 B2 2/2010 Flockhart et al.
9,883,038 B2 * 1/2018 Aleksin ............... G06Q 30/016

OTHER PUBLICATIONS

Rosenberg et al. "SIP: Session Initiation Protocol," Network Working Group, Jun. 2002, RFC 3261, 269 pages.

* cited by examiner

*Primary Examiner* — Rasha S Al Aubaidi
(74) *Attorney, Agent, or Firm* — Sheridan Ross P.C.

(57) ABSTRACT

A number of phantom communication sessions and a number of contact center agents are assigned to a high priority contact center queue. The number of phantom communication sessions are greater than or equal to the number of assigned contact center agents. The high priority contact center queue is used for coordinating communication session routing with an external control application. A first contact center agent of the number of contact center agents is determined to be available. The first contact center agent is assigned to a first phantom communication session in response to determining that the first contact center agent is available. This results in a notification being sent to the external control application that the first contact center agent is available. This allows the external control application to coordinate routing of the communication session.

20 Claims, 7 Drawing Sheets

ANALYTICS-GUIDED CALL ROUTING WITH THIRD PARTY

CROSS REFERENCE TO RELATED APPLICATION

The present application claims the benefits of U.S. Provisional Application Ser. No. 62/540,708, filed Aug. 3, 2017 entitled "ANALYTICS-GUIDED CALL ROUTING", which is incorporated herein by this reference in its entirety.

FIELD

The disclosure relates generally to contact centers and particularly to contact center communication session routing mechanisms.

BACKGROUND

An automatic call distributor (ACD) is a communication device that answers and routes incoming and outgoing communication sessions to a specific group of agent terminals and/or agents in a contact center. One of the issues has been how to operationally provide matching/routing of communication sessions with an agent in conjunction a third party contact center—without significant reconfiguration of routing vectors, agent skills, etc. Most contact centers today do not have the ability to have a third party ACD work in conjunction with a primary ACD to route calls without significant re-administration of routing vectors in the contact center.

SUMMARY

These and other needs are addressed by the various embodiments and configurations of the present disclosure. In some embodiments, a number of phantom communication sessions and a number of contact center agents are assigned to a high priority contact center queue. The number of phantom communication sessions are greater than or equal to the number of assigned contact center agents. The high priority contact center queue is used for coordinating communication session routing with an external control application. A first contact center agent of the number of contact center agents is determined to be available. The first contact center agent is assigned to a first phantom communication session in response to determining that the first contact center agent is available. This assignment results in a notification being sent to the external control application that the first contact center agent is available. The notification sent to the external control application allows the external control application to coordinate routing of the communication session.

In one embodiment, a first contact center agent from a group of contact center agents is determined to have become available. A notification is sent to an external control application that the first contact center agent has become available. This results in at least one of: 1) the sent notification comprising an address of a first agent terminal of the first contact center agent and/or an agent identifier, wherein an incoming request is received from the external control application to establish a communication session to the first agent terminal; 2) the sent notification comprising a plurality of agent identifiers, a plurality of agent attributes, and a plurality of available communication sessions being held in a contact center queue and wherein an incoming message is received from the external control application to establish a communication session between the first agent terminal based and one of the communication sessions being held in the contact center queue; and 3) an address of a communication device is received from the external control application, wherein the address of the communication device is used initiate an outbound communication session to connect the first agent terminal of the first contact center agent to the communication device.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
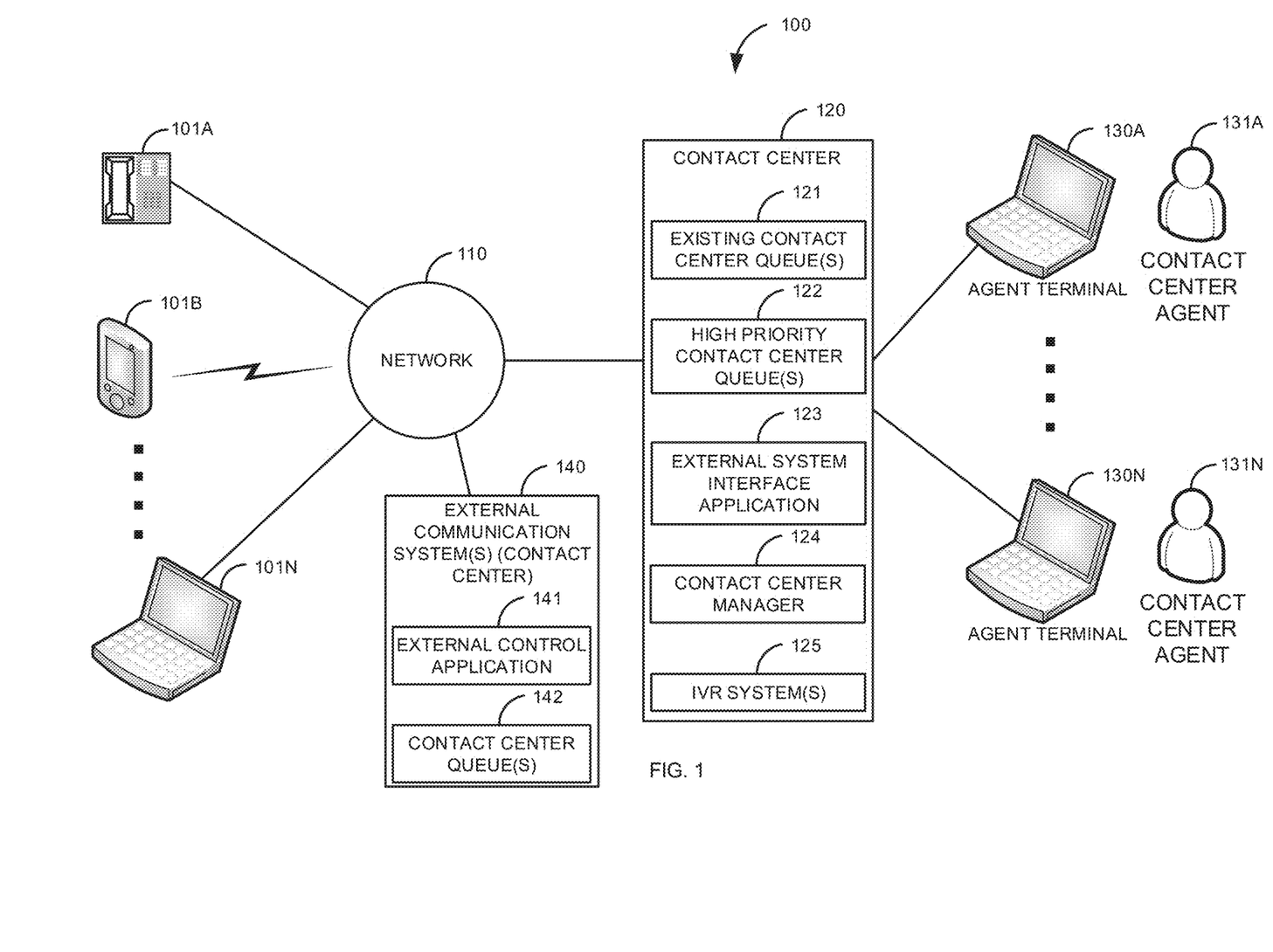
FIG. 1 is a block diagram of a first illustrative system for managing communication sessions with an external control application.

FIG. 1 is a block diagram of a first illustrative system 100 for managing communication sessions with an external control application 140. The first illustrative system 100 includes communication devices 101A-101N, a network 110, a contact center 120, agent terminals 130A-130N, and an external communication system 140.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The contact center 120 can be or may include any system that manages communication sessions between users of the communication endpoints 101A-101N and the contact center agents 131A-131N. The contact center 120 may manage various types of communication sessions, such as, voice communication sessions, video communication sessions, Instant Message (IM) communication sessions, chat communication sessions, email communication sessions, text messaging communication sessions, virtual reality communication sessions, and/or the like. The contact center 120 may manage both inbound and outbound communications. For example, the contact center 120 may provide routing of inbound and/or outbound voice calls between users of the communication endpoints 101A-101N and the contact center agents 131A-131N.

The contact center 120 further comprises existing contact center queue(s) 121 (lower priority contact center queue(s) 121), high priority contact center queue(s) 122, an external system interface application 123, a contact center manager 124, and Interactive Voice Response (IVR) system(s) 125. The existing contact center queue(s) 121 are queues that are used to hold communication sessions for the contact center 120. For example, the existing contact center queue(s) 121 may hold incoming voice calls from users of the communication devices 101A-101N.

The high priority contact center queue(s) 122 are contact center queue(s) that are assigned a higher priority over the existing contact center queue(s) 121. When a contact center agent 131 is assigned to both a high priority contact center queue 122 and an existing contact center queue 121, the contact center agent 131 will be automatically assigned to any communication sessions (e.g., phantom communication sessions discussed later on) in the high priority contact center queue 122 before any communication sessions in the existing contact center queues 121. The high priority contact center queue(s) 122 are used to manage communication sessions with the external control application 141.

The external system interface application 123 can be or may include any hardware coupled with software that provides an interface between the contact center 120 and the external communication system 140. In one embodiment, the external system interface application 123 uses the high priority contact center queue(s) 122 to manage communication sessions between the contact center 120 and the external communication system 140.

The contact center manager 124 can be or may include any hardware coupled with software that can route and manage communication sessions in the contact center 120. For example, the contact center manager 124 may be an Automatic Call Distributor (ACD), a Private Branch Exchange (PBX), a session manager, a communication manager, and/or the like. The contact center manager 124 can manage routing of communication sessions between the communication devices 101A-101N, the existing contact center queues 121, the high priority contact center queues 122, the IVR system(s) 125, and/or the agent terminals 130A-130N.

The Interactive Voice Response (IVR) system(s) 125 can be or may include any hardware coupled with software that can provide voice interaction with users of the communication endpoints 101A-101N.

The agent terminals 130A-130N can be or may include any device that a contact center agent 131A-131N can use to communicate with a user of a communication device 101A-101N. The agent terminals 130A-130N may be a communication device 101 or may comprise multiple communication devices 101. For example, the agent terminals 130A-130N may comprise a telephone and/or a personal computer. The agent terminals 130A-130N may be custom devices with custom software and/or hardware specific to the contact center 120.

The contact center agents 131A-131N are users that handle communication sessions (e.g., inbound and/or outbound communication sessions) with the communication devices 101A-101N.

The external communication system(s) 140 can be or may include any hardware coupled with software that manages communication sessions. The external communication system(s) 140 can manage various types of communication sessions, such as voice communication sessions, video communication sessions, Instant Messaging (IM) communication sessions, chat communication sessions, text messaging communication sessions, virtual reality communication sessions, and/or the like. The external communication system(s) 140 may comprise multiple external communication systems 140. In one embodiment, the external communication system(s) 140 are owned by a third party. For example, the external communication system 140 may be owned by a different company (different from the contact center 120). The external communication system(s) 140 may be a contact center 120 that is provided by a different vendor. For example, the external communication system(s) 140 may be provided by Cisco® and the contact center 120 may be an Avaya® contact center.

The external communication system(s) 140 further comprises an external control application 141 and contact center queues 142. The external control application 141 interfaces with the external system interface application 123 to control routing of communication sessions. The contact center queue(s) 142 can be similar to the existing contact center queue(s) 121.

Figure 2:
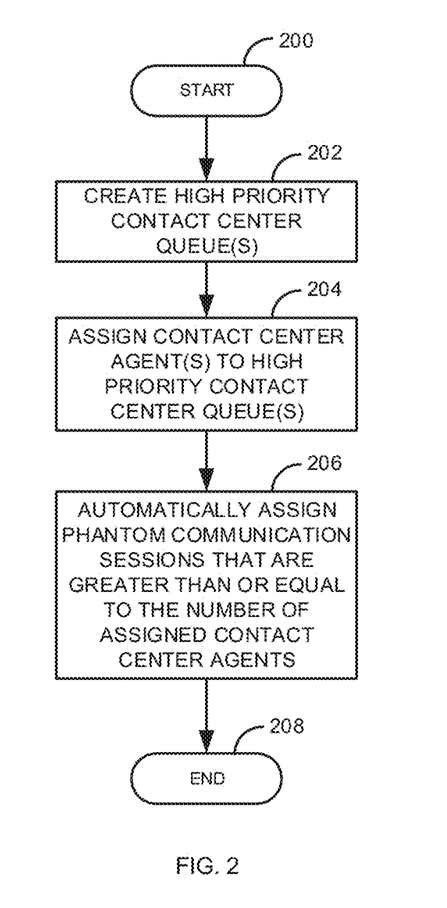
FIG. 2 is a flow diagram of a process for creating a high priority contact center queue to work with an external control application.

FIG. 2 is a flow diagram of a process for creating a high priority contact center queue 122 to work with an external control application 141. Illustratively, the communication devices 101A-101N, the contact center 120, the existing contact center queue(s) 121, the high priority contact queue(s) 122, the external system interface application 123, the contact center manager 124, the IVR system(s) 125, and the agent terminals 130A-130N, the external communication system(s) 140, the external control application 141 and the contact center queue(s) 142 are stored-program-controlled entities, such as a computer or microprocessor, which performs the method of FIGS. 2-7 and the processes described herein by executing program instructions stored in a computer readable storage medium, such as a memory (i.e., a computer memory, a hard disk, and/or the like). Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process starts in step 200. A high priority contact center queue 122 is created in step 202. For example, an administrator may create (via a user interface) the high priority contact center queue 122. Alternatively, the external system interface application 123 may automatically create the high priority contact center queue 122. For example, the external system interface application 123 may automatically create the high priority contact center queue 122 based on communicating with the external control application 141 or based on installation of the external system interface application 123.

In one embodiment, multiple high priority contact center queues 122 can be created (e.g., using any of the processes discussed above). For example, two high priority contact center queues 122 can be created to work with two separate external communication systems 140.

The contact center agents 131A-131N (or a subset of the contact center agents 131A-131N) are assigned to the high priority contact center queue(s) 122 in step 204. For example, an administrator, via a user interface, can assign the contact center agents 131A-131N to one or more high priority contact center queues 122 in step 204. In addition, the contact center agents 131A-131N (or a subset of the contact center agents 131A-131N) may also be assigned to the existing lower priority contact center queues 121.

The external system interface application 123, in response to the assigned contact center agents 131A-131N automatically creates a number of phantom communication sessions that are greater than or equal to the number of assigned contact center agents 131 in step 206. For example, the external system interface application 123 always creates one more phantom communication sessions than the number of contact center agents 131 assigned to the high priority contact center queue 122. The process then ends in step 208. A phantom communication session is a fake communication session that is used as a place holder in the high priority contact center queue 122. The phantom communication session does not represent a real communication session.

Figure 3:
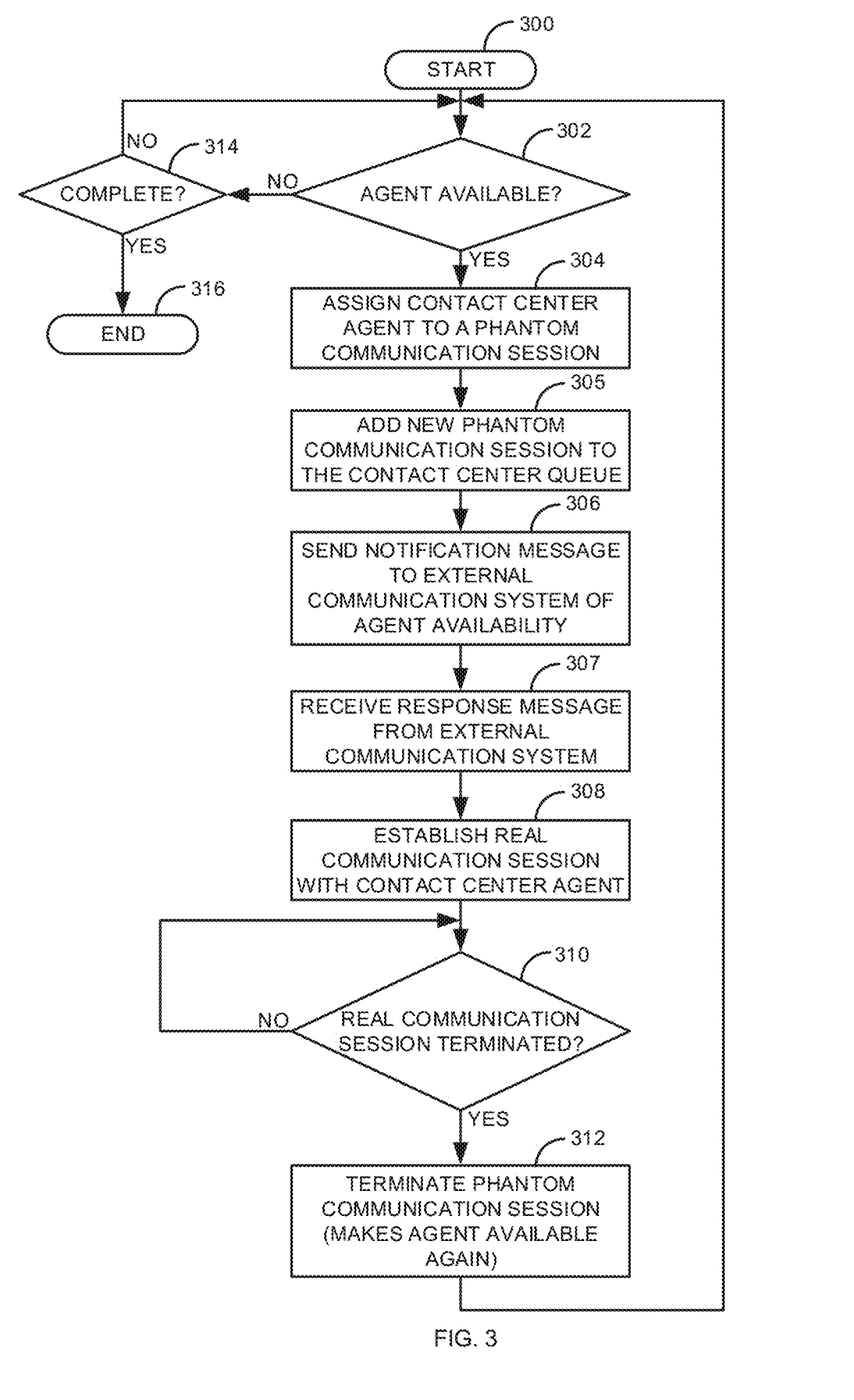
FIG. 3 is a flow diagram of a process for managing communications sessions with an external control application.

FIG. 3 is a flow diagram of a process for managing communications sessions with an external control application 141. The process of FIG. 3 is based the creation of the high priority contact center queue(s) 122 described in FIG. 2.

The process starts in step 300. The contact center manager 124 determines if a contact center agent 131 that is assigned to the high priority contact center queue 122 has become available in step 302. For example, the contact center agent 131 may become available when the contact center agent 131 has logged into the contact center 120 (e.g., by turning on/activating an availability indicator) or has completed an existing communication session (e.g., a terminated voice call, terminated a text chat session, and/or indicated that a response to an email was completed). If a contact center agent 131 is not available in step 302, the contact center manager 124 determines if the process is complete in step 314 (e.g., the high priority contact center queue 122 has been deleted or there are no contact center agents 131 currently assigned to the high priority contact center queue 122). If the process is complete in step 314, the process ends in step 316. Otherwise, if the process is not complete in step 314, the process goes back to step 302.

If a contact center agent 131 is available in step 302, the contact center manager 124 assigns the contact center agent 131 to a phantom communication session in step 304. The assignment results in the phantom communication session being removed from the high priority contact center queue 122. In this manner the assignment of the contact center agent 131 to the communication session (e.g., a phantom communication session) works no differently from the existing contact center queues 121 where a contact center agent 131 is assigned to a communication session when he/she becomes available. Because of this similarity, there is minimal reconfiguration of the contact center 120.

The external system interface application 123 adds a new phantom communication session to the high priority contact center queue 122 in step 305. By adding a new phantom communication session to the high priority queue 122 in step 305, the external system interface application 123 ensures that there will always be a phantom communication session when the contact center agents 131 becomes available. Because the number of phantom communication sessions that are greater than or equal to the number of contact center agents 131A-131N assigned to the high priority contact center queue 122 (higher priority over the existing contact center queue(s) 121), when a contact center agent 131 becomes available who is assigned to the high priority contact center queue 122, the contact center agent 131 who becomes available will automatically be assigned to one of phantom communication sessions in step 304 versus being assigned to one of the existing contact center queues 121 (if the contact center agent 131 is assigned to one or more of the existing contact center queue(s) 121).

The external system interface application 123 monitors the high priority contact center queue 122 to determine when a contact center agent 131 has been assigned to a phantom communication session. When the contact center agent 131 is assigned to a phantom communication session in step 304, the external system interface application 123 sends, in step 306, a notification message (e.g., a Web Real-Time Protocol (Web RTC) or Session Initiation Protocol (SIP) message) to the external control application 141 of the availability of the contact center agent 131. For example, the external system interface 123 may use a Representational State Transfer (REST) Application Programming Interface (API) or similar programming interface to send the notification message of step 306. The notification message of step 306 may comprise various types of information, such as a contact center agent identifier, a telephone number/address of the contact center agent's agent terminal 130, a list of outbound telephone numbers/addresses, attributes of the contact center agent 131 (e.g., a proficiency of the contact center agent 131 to support a particular product), a list of communication sessions being held in an existing contact center queue 121, and/or the like.

In response to sending the notification message of step 306 to the external control application 141, the external control application 141 sends a response message in step 307 to the external system interface application 123. The response message of step 307 may include various types of information, such as an identified communication session being held in an existing contact center queue 121 (which is used to establish a communication session with the contact center agent 131 associated with the phantom communication session). The identified communication session may be any type of communication session, such as, voice, video, email, IM, text message, virtual reality, and/or the like. The response message of step 307 may indicate a user name or other identifier (e.g., a telephone number) that is used by an auto-dialer to establish a communication session with the contact center agent 131 that is associated with the phantom communication session. The response message of step 307 may indicate that an inbound communication session that is being held in the contact center queue 142 or dialed by an auto-dialer in the external contact center 140 is being directed to the contact center agent 131 identified by the phantom communication session.

Based on the response message of step 307, a real communication session (as opposed to the phantom communication session) is established, in step 308, with the contact center agent 131. For example, the external control application 141 may directly call the contact center agent's agent terminal 130 to establish the real/actual communication session between a user at a communication device 101 and the contact center agent 131 at the contact center agent's agent terminal 130. Alternatively, the external control application 141 may select an outbound communication session for the contact center agent 131 or establish a communication with an existing communication session being held in the existing contact center queue 121.

The external system interface application 123 waits, in step 310, for the real communication session to be terminated. When the real communication session terminates in step 310, the phantom communication session is terminated in step 312 and the process goes back to step 302. When the phantom communication session is terminated in step 312, the contact center agent 131 typically becomes available again (unless something overrides the contact center agent's availability) because the real communication session has been terminated. The termination of the phantom communication session makes the high priority contact center queue 122 work similar to the existing contact center queues 121.

Figure 4:
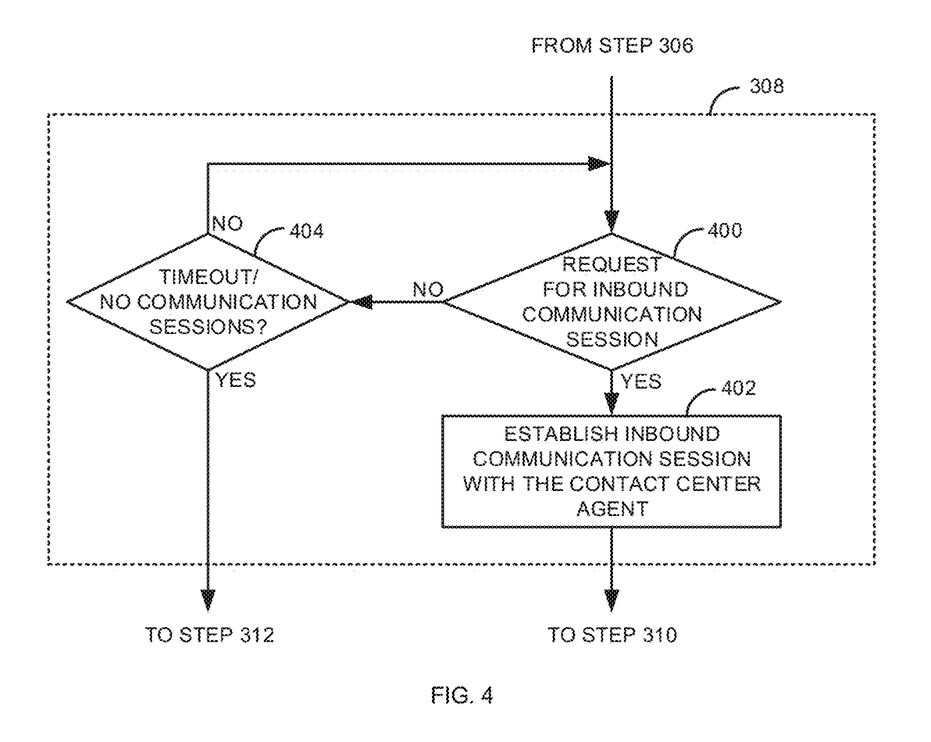
FIG. 4 is a flow diagram of a process for managing inbound communications from an external control application.

FIG. 4 is a flow diagram of a process for managing inbound communications from an external control application 141. The process of FIG. 4 is an exemplary embodiment of step 308 of FIG. 3.

After the notification message/response message of steps 306/307, the external system interface application 123 and/or the contact center manager 124 waits, in step 400, for an inbound request to establish a communication session (e.g., for a communication session held in the contact center queue 142) with the available contact center agent 131. For example, the request for the inbound communication session may be a SIP INVITE message that has the telephone number, a SIP Uniform Resource Identifier, an agent identifier, (information sent in the notification message) and/or the like. If the request to establish the inbound communication session is not received in step 400, the external control system 123 and/or the contact center manager 124 determines if a time period has expired or if there are no communication sessions in step 404. For example, a timeout period may be where the request for the inbound communication session is expected to be received within two seconds. If the timeout has occurred in step 404, the process goes to step 312 and terminates the phantom communication session. In one embodiment, the external system interface application 123 and/or the contact center manager 124 can receive a response from the external control application 141 that indicates that the external control application 141 does not have any waiting communication sessions for the contact center agent 131. Alternatively, the external control application 141 may select an inbound communication session that is waiting in the contact center queue(s) 142 of the external communication system 140.

If there are no waiting communication sessions in step 404, the process goes to step 312, which then terminates the phantom communication session. In one embodiment, where there are no communication sessions, a delay (e.g., a few seconds) may be used before the phantom communication session is terminated in step 312.

Otherwise if a request for an inbound communication session (inbound to the contact center 120 or from the external communication system 140) is received in step 400, the inbound communication session is established with the contact center agent 131 in step 402 and the process goes to step 310. For example, the request to establish the inbound communication session may be a request to establish a communication session between the communication device 101A and the agent terminal 130A. In this embodiment the initial request for the communication session may be based on a communication session that is placed on hold in a contact center queue 142 in the external communication system 140.

In one embodiment, the external control application 141 may work with multiple high priority contact center queues 122 (with phantom communication sessions) in multiple contact centers 120 (e.g., two contact centers 120A and 120B. In this exemplary embodiment, the external control application 141 may select a communication session in a first one of the contact centers 120 and have that communication session routed to a contact center agent 131 in a second contact center 120.

Figure 5:
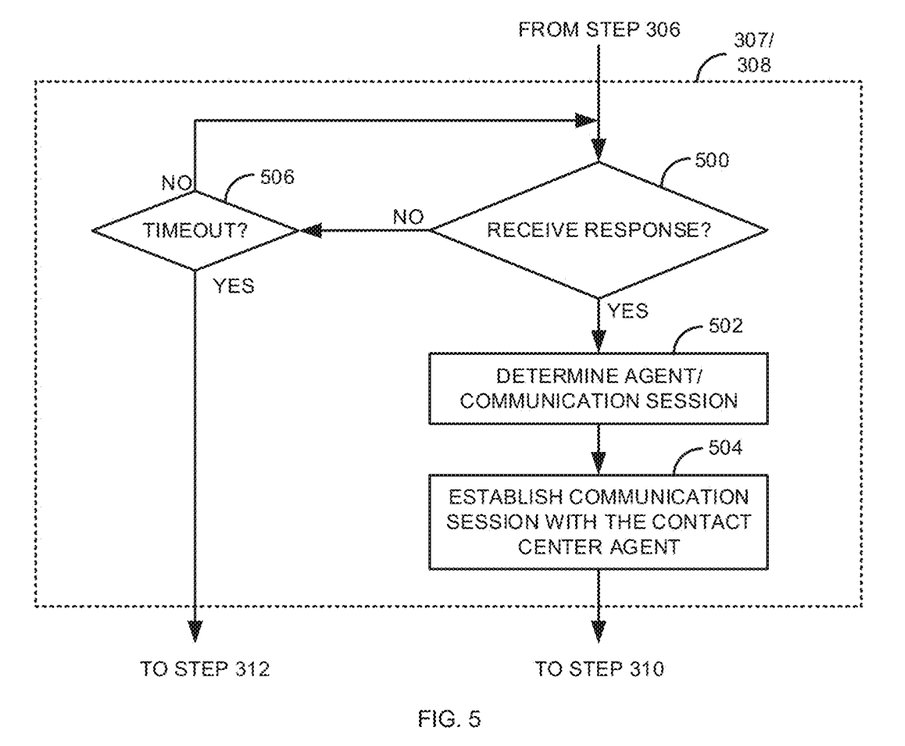
FIG. 5 is a flow diagram of a process for controlling communication sessions from an external control application.

FIG. 5 is a flow diagram of a process for controlling communication sessions from the external control application 141. The process of FIG. 5 is another exemplary embodiment of steps 307/308 of FIG. 3.

After the notification message is sent to the external control application 141 to notify of the agent availability in step 306, the external system interface application 123 waits to receive a response message from the external control application 141 in step 500. If a response is not received in step 500, the external system interface application 123 waits to see if a timeout has occurred in step 506. If a timeout has occurred in step 506, the process goes to step 312. Otherwise, if a timeout has not occurred in step 506, the process goes back to step 500.

If a response is received in step 500, the external system interface application 123 determines, in step 502, how to establish the communication session and then establishes the communication session in step 504. The process then goes to step 310.

For example, the notification message of step 306 may comprise a list of potential users (calls being held in the existing contact center queue(s), which can be in one or more medias) that the available contact center agent 131 can establish a communication session with. The notification of step 306 may also include attributes about the users (e.g., spending habits, purchase history, demographics, etc.) and the agent (e.g., experience supporting customers, sales history, etc.). Based on this information, the external control application 141 can indicate a specific user to make an outbound call to in the received response message of step 500. The external system interface application 123, based on the response message of step 500 determines who the contact center agent 131 is to be connected to in step 502 and the communication session is established with the contact center agent 131 in step 504. The process then goes to step 310.

In one embodiment, the notification message of step 306 may include a list of communication sessions waiting in the existing contact center queue(s) 121 (which may be in different medias), information on the callers, and information on the contact center agent 131 (or similar types of information). The response message received in step 500 can indicate which communication session (of the ones on hold in the existing contact center queue(s) 121) to connect with the contact center agent 131. The external system interface application 123, based on the response, determines who the contact center agent 131 is to be connected to in step 502 and the communication session is established with the contact center agent 131 in step 504.

Figure 6:
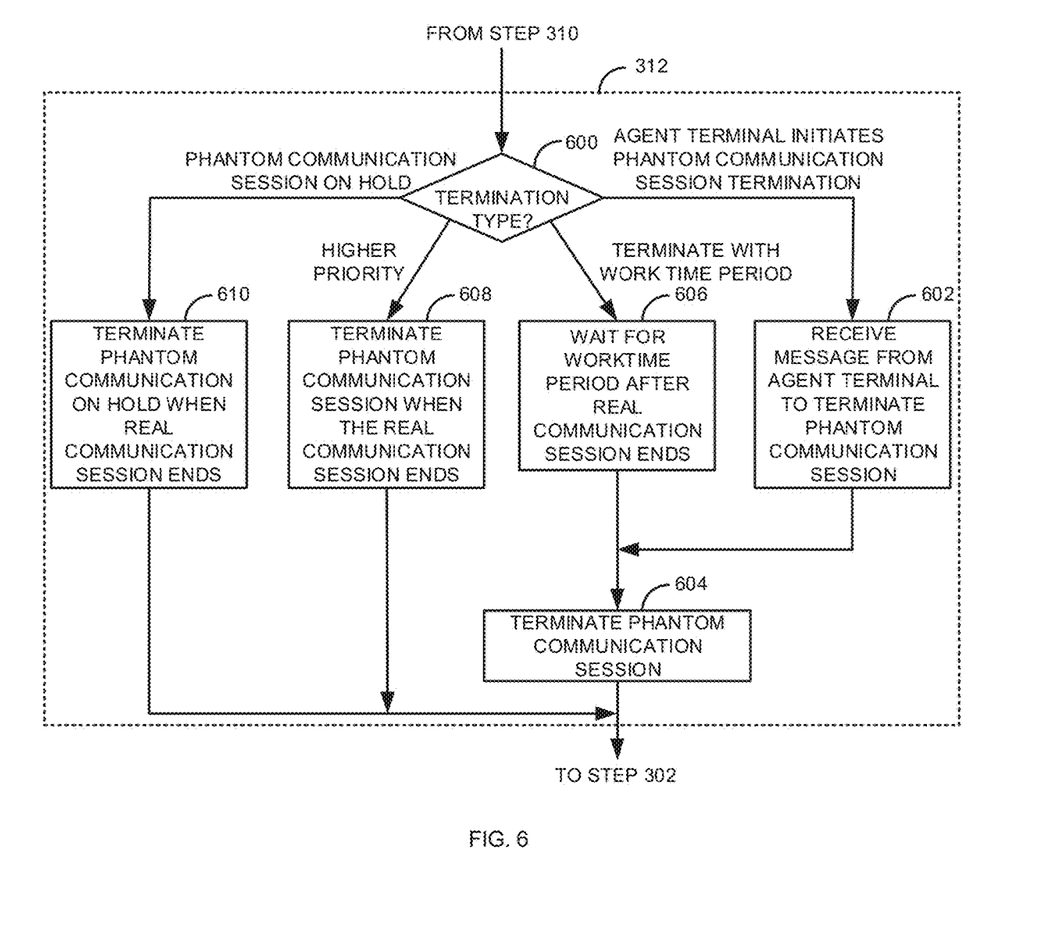
FIG. 6 is a flow diagram of a process for terminating phantom communication sessions in a high priority contact center queue.

FIG. 6 is a flow diagram of a process for terminating phantom communication sessions in a high priority contact center queue 122. The process of FIG. 6 is an exemplary embodiment of step 312 of FIG. 3.

After determining that the real communication session has been terminated in step 310, the external system interface application 123 may terminate the related phantom communication session in various ways in step 600. In one embodiment, when the contact center agent 131 terminates the real communication session at the agent terminal 130, the agent terminal 130 sends a message to the external system interface application 123 that indicates that the real communication session has terminated and to terminate the phantom communication session. The external system interface application 123 receives the message from the agent terminal 130, in step 602, and then terminates the phantom communication session in step 604 and the process goes to step 302.

In one embodiment, the external system interface application 123 determines that real communication session has terminated and waits for a work time period (a time period to permit the termination process to fully complete) in step 606 and then terminates the phantom communication session in step 604. The process then goes to step 302.

In one embodiment, a higher priority communication session is made from the external control application 141 (or a high priority communication session in an existing contact center queue 121). A higher priority communication session can interrupt an existing communication session. In this embodiment, the external system interface application 123 terminates the phantom communication session when the real communication session ends in step 608. The process then goes to step 302.

In one embodiment, when the real communication session is established, the phantom communication session is placed on hold. The external system interface application 123 then terminates the phantom communication session that is on hold in step 610 and the process goes to step 302.

Figure 7:
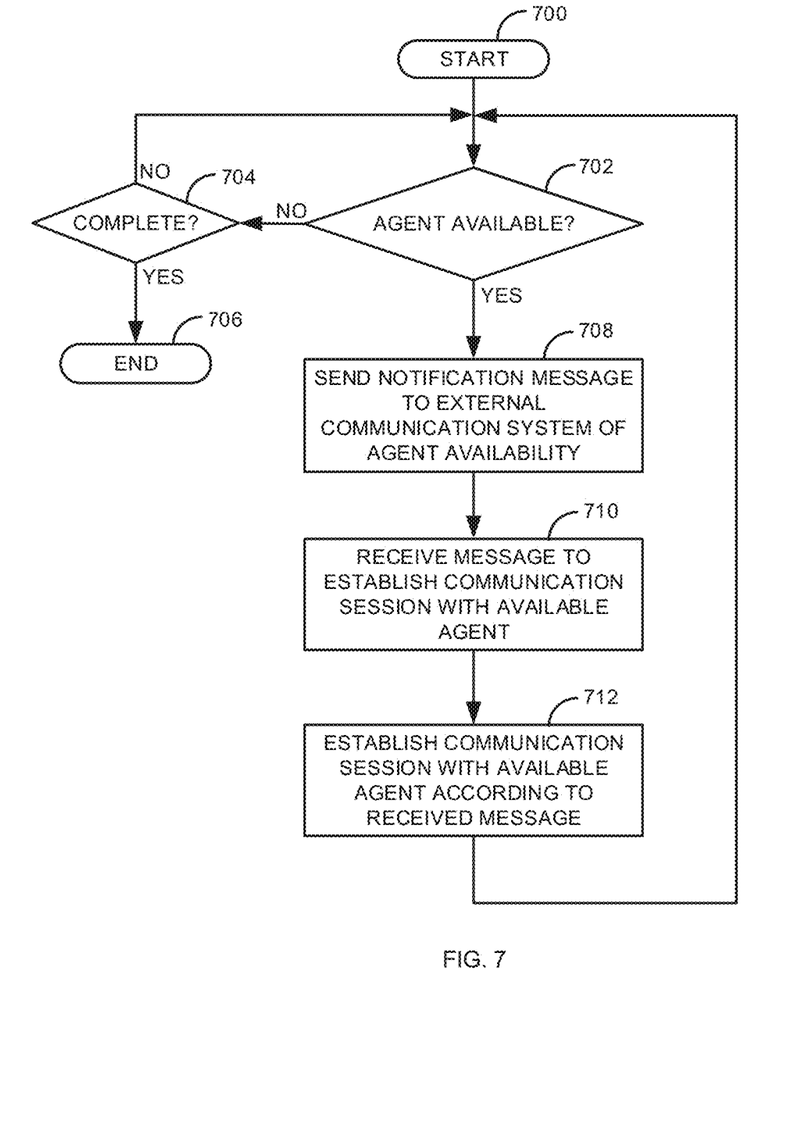
FIG. 7 is a flow diagram of a process for establish a communication session based on control from an external communication system.

FIG. 7 is a flow diagram of a process for establish a communication session based on control from an external communication system 140. The process starts in step 700. The external system interface application 123 determines if a contact center agent 131 that is assigned to an existing contact center queue 121 has become available in step 702. For example, the contact center agent 131 may become available when the contact center agent 131 has logged to the contact center 120 (e.g., turning on an availability indicator) or has completed an existing communication session (e.g., a terminated voice call or indicated that a response to an email was completed). If a contact center agent 131 is not available in step 702, the contact center manager 124 determines if the process is complete in step 704. If the process is complete in step 704, the process ends in step 706. Otherwise, if the process is not complete in step 704, the process goes back to step 702.

If a contact center agent 131 is available in step 702, the external system interface application 123 sends, in step 708, a notification message to the external control application 141. The notification message of step 708 may comprise various types of information. In one embodiment, the notification message of step 708 comprises an address of an agent terminal 130 of a contact center agent 131 and/or an agent identifier. In another embodiment, the notification message of step 708 comprises a plurality of agent identifiers, a plurality of agent attributes, and/or a plurality of available communication sessions being held in the existing contact center queue(s) 121. The communication sessions are used by the external control application 141 to determine a communication device 101 for establishing a communication session with an agent terminal 130 of the available contact center agent 131.

The external system interface application 123 receives, in step 710, a message to establish a communication session with the available contact center agent 131. For example, the message of step 710 may indicate which communication session in the existing contact center queue 121 to connect the available contact center agent 131 to. In one embodiment, the message of step 710 may include an address of a communication device (e.g., a telephone number) for the available contact center agent 131 to establish a communication session with. Alternatively, the message of step 710 may be to establish a communication session (from the external control system 140) with a communication session that was being held in the contact center queue 142. One of skill in the art would understand that any of the methods used in FIGS. 2-6 may be used to establish the communication session. The communication session is then established with the available contact center agent in step 712 and the process goes back to step 702.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions stored thereon that program the microprocessor to:
assign a number of phantom communication sessions and a number of contact center agents to a high priority contact center queue, wherein the number of phantom communication sessions is greater than or equal to the number of assigned contact center agents, wherein the number of phantom communication sessions each comprises a rake communication session that is used as a place holder in the high priority contact center queue, and wherein the high priority contact center queue is used for coordinating communication session routing with an external control application;
receive an indication that a first contact center agent of the number of contact center agents is available;
assign the first contact center agent of the number of contact center agents to a first phantom communication session of the number of phantom communication sessions in response to receiving the indication that the first contact center agent is available; and
send an electronic notification message to the external control application that the first contact center agent is available.

2. The system of claim 1, wherein the microprocessor readable and executable instructions further program the microprocessor to: receive an incoming communication session from an external system to a first agent terminal of the first contact center agent in response to sending the notification.

3. The system of claim 2, wherein the incoming communication session is a direct routed call with a higher priority over existing calls at the first agent terminal and automatically connects to the first agent terminal.

4. The system of claim 1, wherein the electronic notification message further identifies a plurality users and user attributes and wherein the microprocessor readable and executable instructions further program the microprocessor to: receive a message from the external control application that identifies an individual user of the plurality of users and auto-dial the individual user of the plurality of users to establish a communication session with the first contact center agent.

5. The system of claim 1, wherein the microprocessor readable and executable instructions further program the microprocessor to: place the first phantom communication session on hold in response to sending the electronic notification message and remove the first phantom communication session from hold in response to the first contact center agent ending an associated real communication session.

6. The system of claim 1, wherein the electronic notification message identifies a plurality of communication sessions in a lower priority contact center queue and wherein the microprocessor readable and executable instructions further program the microprocessor to: receive a message from the external control application to route one of the plurality of communication sessions in the lower priority contact center queue to the first contact center agent and route the one of the plurality of communication sessions in the lower priority contact center queue to the first contact center agent.

7. The system of claim 1, wherein the microprocessor readable and executable instructions further program the microprocessor to: terminate the first phantom communication session based on a communication work time period.

8. The system of claim 1, wherein creating the high priority contact center queue, assigning the number of contact center agents to the high priority contact center queue, and assigning the number of phantom communication sessions to the high priority contact center queue are independent of communication session routing vectors for any of the existing contact center queues.

9. The system of claim 1, wherein the microprocessor readable and executable instructions further program the microprocessor to: receive, from the external control application, a communication address; and initiate an outbound communication session to connect a first agent terminal of the first contact center agent to a communication device associated with the communication address.

10. The system of claim 1, wherein the electronic notification message comprises an agent identifier, a communication session identifier, and agent attributes and wherein the microprocessor readable and executable instructions further program the microprocessor to: receive, from the external control application the agent identifier and the communication session identifier, wherein the agent identifier and the communication session identifier are used to establish a communication session with a first agent terminal of the first contact center agent.

11. A method comprising:
assigning, by a microprocessor, a number of phantom communication sessions and a number of contact center agents to a high priority contact center queue, wherein the number of phantom communication sessions is greater than or equal to the number of assigned contact center agents, wherein the number of phantom communication sessions each comprises a fake communication session that is used as a place holder in the high priority contact center queue, and wherein the high priority contact center queue is used for coordinating communication session routing with an external control application;
receiving, by the microprocessor, an indication that a first contact center agent of the number of contact center agents is available;
assigning, by the microprocessor, the first contact center agent of the number of contact center agents to a first phantom communication session of the number of phantom communication sessions in response to receiving the indication that the first contact center agent is available; and
sending, by the microprocessor, an electronic notification message to the external control application that the first contact center agent is available.

12. The method of claim 11, further comprising: receiving an incoming communication session from the external control application to a first agent terminal of the first contact center agent in response to the sent notification.

13. The method of claim 11, wherein the electronic notification message identifies a plurality of communication sessions in a lower priority contact center queue and further comprising: receiving a message from the external control application to route one of the plurality of communication sessions in the lower priority contact center queue to the first contact center agent and routing the one of the plurality of communication sessions in the lower priority contact center queue to the first contact center agent.

14. The method of claim 11, further comprising: placing, by the microprocessor, the first phantom communication session on hold in response to sending the electronic notification message and removing the first phantom communication session from hold in response to the first contact center agent ending a real communication session.

15. The method of claim 11, further comprising receiving, by the microprocessor, from the external control application, a communication address, and initiating an outbound communication session to connect a first agent terminal of the first contact center agent to a communication device associated with the communication address.

16. A system comprising:
a microprocessor; and
a computer readable medium, coupled with the microprocessor and comprising microprocessor readable and executable instructions stored thereon that program the microprocessor to:
determine that a first contact center agent from a group of contact center agents has become available;
in response to determining that the first contact center agent has become available, assign the first contact center agent to a phantom communication session, wherein the phantom communication session comprises fake communication session that is used as a place holder in a high priority contact center queue; and
send an electronic notification message, to an external control application that the first contact center agent has become available and been assigned to the phantom communication session; and wherein at least one of the following is true:
(i) the sent electronic notification message comprises an address of a first agent terminal of the first contact center agent and/or an agent identifier and wherein an incoming request is received from the external control application to establish a communication session to the first agent terminal,
(ii) the sent electronic notification message comprises a plurality of agent identifiers, a plurality of agent attributes, and a plurality of available communication sessions being held in a contact center queue and wherein an incoming message is received from the external control application to establish a communication session between the first agent terminal and one of the communication sessions being held in the contact center queue; and (iii) an address of a communication device is received from the external control application, wherein the address of the communication device is used to initiate an outbound communication session to connect the first agent terminal of the first contact center agent to the communication device.

17. The system of claim 16, wherein step (i) is performed.

18. The system of claim 16, wherein step (ii) is performed.

19. The system of claim 16, wherein step (iii) is performed.

20. The system of claim 16, wherein the electronic notification message further comprises attributes associated with the first contact center agent that are used by the external control application determine a communication device for establishing a communication session with a first agent terminal of the first contact center.

* * * * *

UNITED STATES PATENT AND TRADEMARK OFFICE
CERTIFICATE OF CORRECTION

Page 1 of 1

PATENT NO. : 10,694,041 B2
APPLICATION NO. : 16/046227
DATED : June 23, 2020
INVENTOR(S) : Valentine C. Matula et al.

It is certified that error appears in the above-identified patent and that said Letters Patent is hereby corrected as shown below:

In the Claims

At Column 16, Line 53, before the phrase "fake communication session" insert --a-- therein.

Signed and Sealed this
Eighth Day of September, 2020

Andrei Iancu
*Director of the United States Patent and Trademark Office*